(12) United States Patent
Shu et al.

(10) Patent No.: US 8,680,943 B2
(45) Date of Patent: Mar. 25, 2014

(54) DCS/WCDMA DUAL FREQUENCY SYNTHESIZER AND A GENERAL DUAL FREQUENCY SYNTHESIZER

(75) Inventors: Mengmeng Shu, Guangzhou (CN); Tao He, Guangzhou (CN); Bin He, Guangzhou (CN); Jingmin Huang, Guangzhou (CN)

(73) Assignee: Comba Telecom System (China) Ltd., Science, Guangzhou, Guangdong Province (CN)

( * ) Notice: Subject to any disclaimer, the term of this patent is extended or adjusted under 35 U.S.C. 154(b) by 796 days.

(21) Appl. No.: 12/601,396

(22) PCT Filed: May 28, 2007

(86) PCT No.: PCT/CN2007/001709
§ 371 (c)(1),
(2), (4) Date: May 21, 2010

(87) PCT Pub. No.: WO2008/141482
PCT Pub. Date: Nov. 27, 2008

(65) Prior Publication Data
US 2010/0254366 A1    Oct. 7, 2010

(30) Foreign Application Priority Data

May 23, 2007  (CN) .......................... 2007 1 0028152

(51) Int. Cl.
| H03H 7/46 | (2006.01) |
| H03H 7/48 | (2006.01) |
| H01P 5/12 | (2006.01) |
| H01P 1/20 | (2006.01) |
| H01P 3/06 | (2006.01) |
| H04B 7/216 | (2006.01) |
| H04B 7/00 | (2006.01) |

(52) U.S. Cl.
USPC ........... 333/132; 333/134; 333/202; 333/206; 455/260

(58) Field of Classification Search
USPC ............................................ 370/342; 333/132
See application file for complete search history.

(56) References Cited

U.S. PATENT DOCUMENTS 7,164,306 B2 *  1/2007  Makino ......................... 327/407
2004/0182599 A1 *  9/2004  Nguyen .................... 174/138 D
(Continued)

FOREIGN PATENT DOCUMENTS

CN  2718801 Y  8/2005
CN  2766354 Y  3/2006
(Continued)

OTHER PUBLICATIONS

International Search Report for Application No. PCT/CN2007/001709 dated Mar. 13, 2008.

*Primary Examiner* — Shaq Taha

(57) ABSTRACT

The invention discloses a DCS/WCDMA dual frequency multiplexer. On one hand, the multiplexer utilizes distributed parameter type capacitors in place of conventionally used capacitors. On the other hand, within the multiplexer, a direct circuit and a RF circuit are isolated from each other physically. All components including capacitors co-exist together physically. Similarly, the invention further discloses a dual frequency multiplexer with large application range. It also utilizes the distributed parameter type capacitors like the DCS/WCDMA dual frequency multiplexer. Because the invention has redesigned the entire construction of the multiplexer, it results good effects such as small size, less differential loss, large power capacity, as well as high isolation degree between circuits.

20 Claims, 2 Drawing Sheets

(56) References Cited

U.S. PATENT DOCUMENTS

2006/0046663 A1  3/2006 Yu
2007/0183348 A1* 8/2007 Totsuka et al. ................ 370/276

FOREIGN PATENT DOCUMENTS

CN  201018482 Y  2/2008
CN  201018487 Y  2/2008

* cited by examiner

DCS/WCDMA DUAL FREQUENCY SYNTHESIZER AND A GENERAL DUAL FREQUENCY SYNTHESIZER

FIELD OF THE INVENTION

The invention relates to a processing device for multiplexing a DCS system and a WCDMA system and more particularly, relates to a DCS/WCDMA dual frequency multiplexer.

BACKGROUND OF THE INVENTION

With the rapid development of mobile communications, a scheme in which multiple systems share a common station as well as a common antenna feeder resource has gotten its population by more and more operators. By this way, advantage of sharing resource and reducing system device cost can be obtained. In DCS/WCDMA system sharing a common antenna feeder, dual frequency multiplexer is a necessary microwave component that mainly serves to multiplex/de-multiplex signals of different systems so as to save the length of feed cable, simplify system construction and reduce cost. In addition, power is supplied to the devices at base station tower via a radio frequency cable and accordingly, the multiplexer connected with the feed cable must have the ability of passing direct current there through.

With reference to the schematic diagram of FIG. 1, a multiplexer is a microwave component having three ports, i.e., two direct current feed circuits and two RF signal circuits, wherein each direct current feed circuit is constructed by a lump parameter low pass filter, a switch and a lightning protection device. The low pass filter is used to suppress RF signal at high frequency such that control signal at certain frequency (such as 3 MHz) can pass the filter with ease. The switch serves to selectively conduct direct current there through. The RF signal circuit consists of a blocking capacitor and a band pass filter. The band pass filters of respective two RF signal circuits have their band pass range be set so as to be suited to frequency range of two signals to be multiplexed. During operation, the signal input from a common port Port1 is shunted to Port2 or Port3 according to the frequency range. Alternatively, the signal input from ports Port2 or Port3 may also be combined and output via the port Port1.

The RF signal frequency range of the system in which DCS/WCDMA sharing a common antenna feeder is 1710 MHz-1880 MHz and 1920 MHz-2170 MHz respectively. By now, to obtain such wide a work frequency band and capability of passing direct current, most multiplex products employ dielectric substrates and realize it by micro-strip circuits. The disadvantages of product of this type include large bulkage and low power capacity. Moreover, inactive inter-modulation is greatly depended on property of dielectric substrate material and therefore, it is difficult to control the dielectric substrate material during batch production.

SUMMARY OF THE INVENTION

One object of the invention is to provide a DCS/WCDMA dual frequency multiplexer which can be minimized in size, reduce differential loss, obtain large power capacity, and have high isolation degree between direct current circuit and RF signal circuit.

Another object of the invention is to provide a more general dual frequency multiplexer so as to extend application field of the invention, for example application of the invention into a system in which 2G and 3G share a common antenna feeder.

To this end, the invention utilizes the following technical scheme.

The DCS/WCDMA dual frequency multiplexer of the invention is used to perform multiplexation of two signals of different frequency, and includes a multiplexer port, a first port and a second port. The first and second ports are both connected with the multiplexer port through a RF (radio frequency) circuit and a direct current circuit respectively. Each RF circuit comprises a band pass filter and capacitors connected with the band pass filter at two sides thereof in series; the two band pass filters are coupled with the multiplexer port via a common capacitor; each direct circuit comprises a low pass filter and a discharging tube connected to the low pass filter electrically; and the two direct circuit are electrically connected to the multiplexer port through the low pass filter.

The multiplexer also comprises a box including a base body, a circuit board and a cover body; the two band pass filters are disposed in the base body and separated from each other by a metal plate; the multiplexer port, first and second ports are positioned on lateral sides of the base body; the capacitors are contained in corresponding band pass filters; a plurality of support members are disposed on top portion of the base body; the low pass filters are supported on the support members; the discharging tube and switch are secured on the circuit board; the cover body is clamped together with the base body.

The capacitors each are of distributed parameter capacitor.

Each capacitor includes an inner conductor, an insulator and a sleeve; the insulator surrounds the inner conductor at outer perimeter thereof, while the sleeve surrounds the outer perimeter of the insulator; the sleeve serves to electrically connect to adjacent band pass filters; the inner conductor is used to connect electrically with adjacent direct current circuit so as to be connected with an adjacent port.

The insulator is Polytetrafluoroethene film.

Each band pass filter comprises a plurality of harmonic posts; and a ridge is formed between two adjacent harmonic posts for enhancement of coupling effect.

The circuit board has several tuning screws corresponding to the two band pass filters, the tuning screws passing through the circuit board and extending into inside of the band pass filters for adjusting harmonic frequency and coupling degree.

Inductive coupling is generated in the first band pass filter by creating openings in the filter, while capacitive coupling is generated in the second band pass filter by means of flying bars.

The first and second band pass filters share a common harmonic post at a location adjacent the multiplexer port.

The number of the harmonic posts of the band pass filter located between the first port and multiplexer port is seven, whereas the number of the harmonic posts of the band pass filter located between the second port and multiplexer port is eight.

The direct circuit also comprises a switch; the printed circuit of the direct circuit has several discontinous locations where slots are defined, and metal magnetic beads are situated in the slots in order to open or close the direct circuit.

A gap with a width not less than 0.2 mm is defined between the top surface of the support member and a bottom surface of the circuit board.

The cover plate has a through hole defined therein on which a Gore permeable film is covered.

A waterproof plate is placed on the through hole.

The second object of the invention is obtained by the following technical solution.

A general dual frequency multiplexer used to perform multiplexation of two signals with different frequency, comprising a multiplexer port, a first port, and a second port, wherein the first and second ports are both connected with the multiplexer port through a RF circuit and a direct current circuit respectively; each RF circuit comprises a band pass filter and capacitors connected with the band pass filter at two sides thereof in series; the two band pass filters are coupled with the multiplexer port via a common capacitor; each direct circuit comprises a low pass filter and a discharging tube connected to the low pass filter electrically; and the two direct circuit are electrically connected to the multiplexer port through the low pass filter; the capacitors each are of distributed parameter capacitor.

Each capacitor includes an inner conductor, an insulator and a sleeve; the insulator surrounds the inner conductor at outer perimeter thereof, while the sleeve surrounds the outer perimeter of the insulator; the sleeve serves to electrically connect to adjacent band pass filters; the inner conductor is used to connect electrically with adjacent direct current circuit so as to be connected with an adjacent port.

The insulator is Polytetrafluoroethene film.

Each band pass filter comprises a plurality of harmonic posts; and a ridge is formed between two adjacent harmonic posts for enhancement of coupling effect.

The circuit board has several tuning screws corresponding to the two band pass filters, the tuning screws passing through the circuit board and extending into inside of the band pass filters for adjusting harmonic frequency and coupling degree.

Inductive coupling is generated in the first band pass filter by creating openings in the filter, while capacitive coupling is generated in the second band pass filter by means of flying bars.

The first and second band pass filters share a common harmonic post at a location adjacent the multiplexer port.

Compared with prior art, the invention can get the following good effects. The dual frequency multiplexer of the invention is implemented by band pass filters, thereby separating the direct circuit and RF circuit from each other. The utilization of distributed parameter type of capacitors brings size reduction of the product of the invention. Moreover, the invention has designed the entire construction, hence leading to good effects such as small size, less differential loss, large power capacity, as well as high isolation degree between circuits.

DETAILED DESCRIPTION OF THE INVENTION

Figure 1:
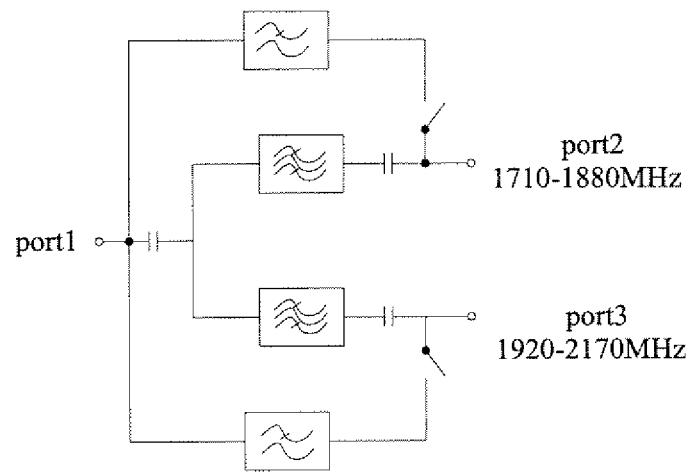
FIG. 1 illustrates a schematic diagram of the invention.

With reference to FIG. 1, the DCS/WCDMA dual frequency multiplexer of the invention is mostly used to combine 2G signal and 3G signal together.

Figure 2:
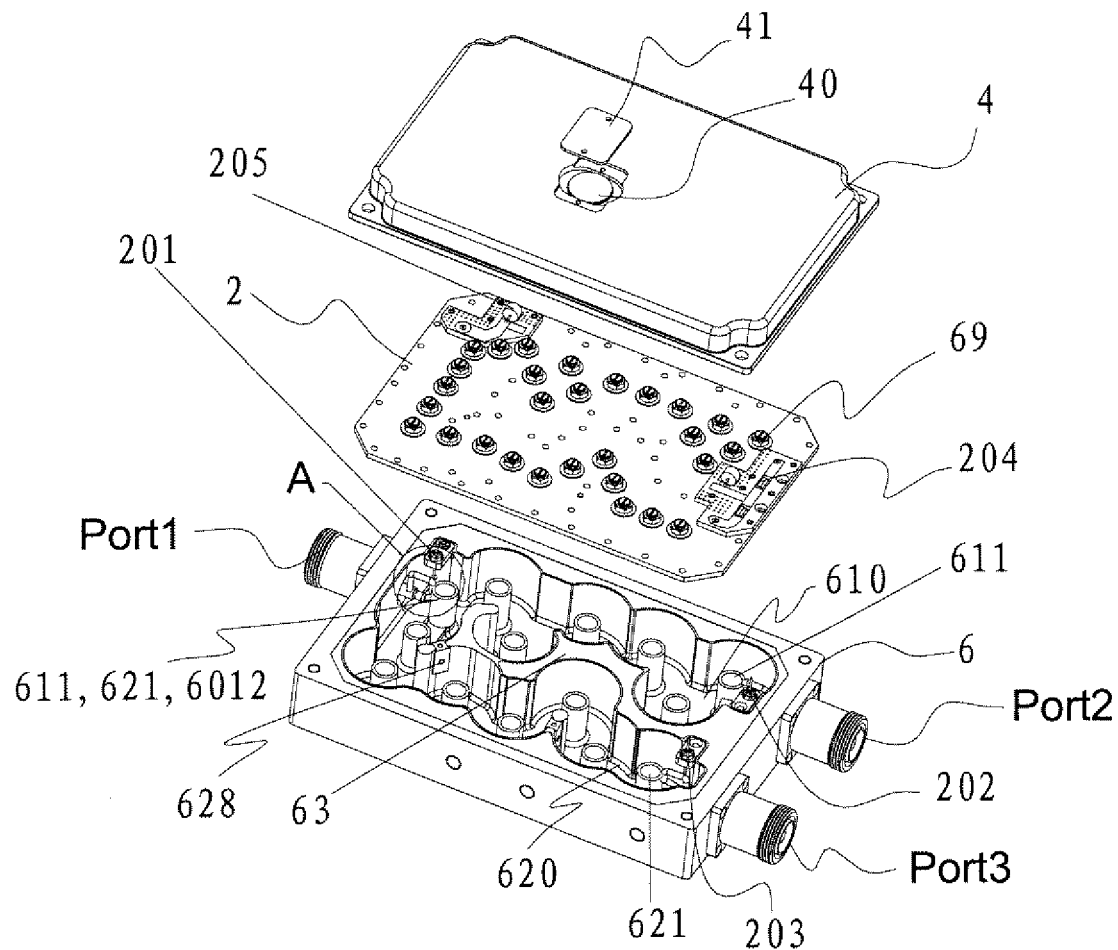
FIG. 2 illustrates a perspective view of the product of the invention.

As shown in FIG. 2, the multiplexer is of a box type, and is constructed by a base body 6, a circuit board 2 and a cover body 4 collectively.

A first port Port2 and a second port Port3 are provided at right side of the base body 6, both of which are adapted to receive radio frequency (RF) signals with frequency of 1710-1880 MHz and 1920-2170 MHz respectively. A multiplexer port Port1 is located at the left side of the base body 6. The multiplexer port Port1 is able to output RF signal multiplexed by the first and second ports (Port2 and Port3). Alternatively, a signal can be input into the multiplexer port Port1 and then de-multiplexed through the first and second ports (Port2 and Port3).

Two RF circuits, that is, a first RF circuit for transmitting DCS signal and a second RF circuit for transmitting WCDMA signal are integrated in the base body 6. The first RF circuit is constructed by the first port Port2, a first capacitor 68' (see FIG. 4), a first band pass filter 610, a third capacitor 68 and a multiplexer port Port1, all of which are electrically connected with each other in series. The second RF circuit is constructed by the second port Port3, a second capacitor 68 (see FIG. 4), a second band pass filter 620, a third capacitor 68 and the multiplexer port Port1, all of these components being connected with each other electrically.

It is clear that each RF circuit includes an individual band pass filters (610 or 620), and shares the third capacitor 68.

Figure 4:
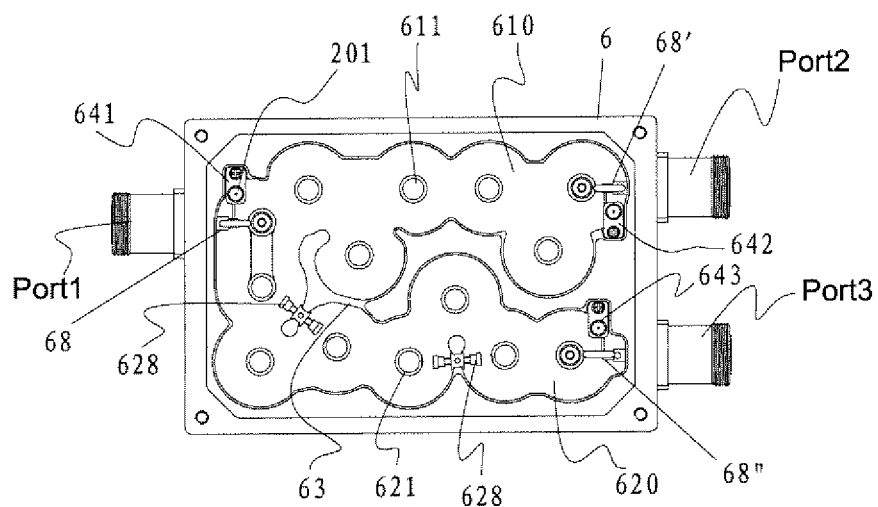
FIG. 4 shows top plan view of a base body of the invention.

Each of band pass filters 610 and 620 is constructed by coaxial harmonic chamber, and includes plural harmonic posts 611 and 621. As illustrated in FIGS. 2 and 4, a compartment defined in middle portion of the base body 6 is divided into two parts by a metal plate 63, these two parts being the first band pass filter 610 corresponding to the first RF circuit and the second band pass filter 620 corresponding to the second RF circuit. The separation effect caused by the metal plate 63 can result in higher isolation between the first and second RF circuits. Seven harmonic posts 611 are sequentially arranged in the first band pass filter 610. A harmonic post 611 close to the first port Port2 is electrically coupled to the first capacitor 68' via a wire, thereby being further coupled with the first port Port2. Eight harmonic posts 621 are sequentially arranged in the second band pass filter 620. A harmonic post 611 close to the second port Port3 is electrically coupled to the second capacitor 68" via a wire, thereby being further coupled with the second port Port3. A harmonic post 6012 located adjacent the multiplexer port Port1 is shared by the first and second band pass filters 610 and 620. In fact, the total number of the harmonic posts for the both band pass filters is fourteen. The harmonic post 6012 common to both filters may be used to transfer the signal of band pass filters 610 and 620 to the multiplexer port Port1 through a wire 671 by means of electromagnetic resonance.

As seen from FIGS. 2 and 4, the band pass filters 610 and 620 are not completely isolated by the metal plate 63 located between therebetween.

To ensure isolation of the WCDMA RF circuit, two inductive couplings are formed in the first band pass filter 610 by creating openings on the band pass filter 610, thereby resulting two suppression points at right side of the pass band and WCDMA band pass in total.

To ensure isolation of the DCS RF circuit, two capacitive couplings are formed in the second band pass filter 620 by providing flying bars on the band pass filter 610, thereby resulting two suppression points at left side of the pass band and DCS band pass in total.

Figure 3:
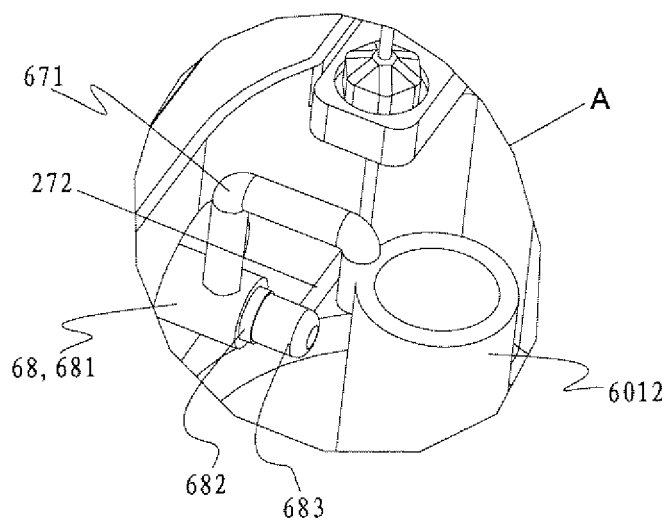
FIG. 3 illustrates an enlarged view of portion A of FIG. 2.

With reference to FIGS. 2, 3 and 4, the first and second capacitors 68 and 68" have the same construction as the third capacitor 68. The third capacitor 68 includes an inner conductor 683, an insulator 682 and a sleeve 681. The insulator 682 surrounds the inner conductor 683, while the sleeve 681 surrounds the insulator 682. The insulator 682 is implemented by medium film such as Polytetrafluoroethene (PTFE). The sleeve 681 is electrically coupled with the common harmonic post 6012 of the first and second band pass filters 610 and 620, while the inner conductor 683 is coupled with the multiplexer port Port1 directly. As such, the sleeve 681 and inner conductor 683 can be isolated from each other by the insulator 682 so as to construct distributed parameter capacitor. For two RF circuits, transmission of RF signal is carried out by coupling between the inner conductor 683 and sleeve 681. For two direct current circuits, they are directly connected to the inner conductor 683 such that direct current is prohibited to pass through the sleeve 681, hence direct current being blocked by the RF circuit.

As described above, the first and second capacitors 68' and 68" employ the same construction as the third capacitor 68. However, the sleeve of the first capacitor 68' is connected only to a harmonic post 611 adjacent the first capacitor 68', of the first band pass filter 610, whilst the sleeve of the second capacitor 68" is connected only to a harmonic post adjacent the second capacitor 68", of the second band pass filter 620.

The inner conductors of corresponding capacitors are extended out of and electrically connected with the ports Port1, Port2 and Port3 respectively.

Figure 5:
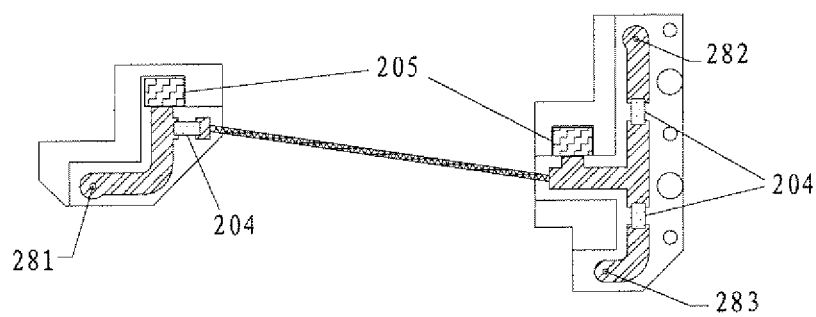
FIG. 5 shows a schematic view of a printed circuit of the direct current circuit of the circuit board of FIG. 2.

Referring to FIG. 2 again, the circuit board 2 has a printed circuit board supported thereon. The printed circuit is shown in FIG. 5 and mainly located at two sides of the circuit board 2. Direct circuits of the dual multiplexer are techniques of well known and description thereof is set forth below in brief.

Referring to FIGS. 1, 2 and FIG. 5, two direct current circuits, namely a first direct current circuit and a second direct current circuit are incorporated into the circuit board 2. Each direct current circuit is mainly constructed of low pass filters 201, 202 and 203, switches and lightning protection components 205. Signals coming from the first/second ports Port2/Port3 of the first/second direct current circuits are filtered by a first/second low pass filter 202/203, then combined together and outputted to the third low pass filter 201, and finally outputted to the multiplexer port Port1. The low pass filters 201, 202 and 203 serve mainly to suppress high frequency signal while permitting transmission of control signal with a frequency less than 3 MHz. Moreover, a switch may be provided between the two direct current circuits depending upon need to determine whether transmission of direct current is allowed. Lightning protection component 205 made of discharging tube may be further provided.

The printed circuit diagram of FIG. 5 shows three connection nodes 281, 282 and 283 of the low pass filters 201, 202 and 203. The low pass filters 201, 202 and 203 are supported independently on three support members. As shown in FIG. 2, the three support members 641, 642 and 643 are disposed on top edges of the two band pass filters 610 and 620, and are adjacent to respective ports Port1, Port2 and Port3 (see FIG. 4). Each support member has respective low pass filters 201, 202 and 203 supported thereon.

One ends of respective low pass filters 201, 202 and 203 are connected to capacitors of adjacent ports Port1, Port2, Port3. More specifically, one end of the third low pass filter 201 is electrically connected with the inner conductor 683 of the third capacitor 68; one end of the first low pass filter 202 is electrically connected with the inner conductor of the first capacitor 68'; while one end of the second low pass filter 203 is electrically connected with the inner conductor of the second capacitor 68". The other ends of the low pass filters 201, 202 and 203 have predefined contact pads 26 which contact respectively with the connection nodes 281, 282 and 283 of the printed circuit board shown in FIG. 5. Corresponding to three contact pads 26, three holes are defined in the circuit board 2. Engagement of three holes defined in the circuit board 2 with three contact pads 26 ensures connection between the circuit board 2 and base body 6. At this time, three connection nodes 281, 282 and 283 of the printed circuit board shown in FIG. 5 contact with the contact pads 26 of three low pass filters 201, 202 and 203 of three support members respectively, thus resulting connection of the low pass filters 201, 202 and 203 with the direct current circuit. A gap with a width not less than 0.2 mm is defined between the top surface of the support member and the circuit board in order to maintain good electrical performance of the RF signal.

The switches are implemented by some metal magnetic beads 204 welded onto the circuit board to suppress high frequency signal. Locations of the printed circuit where the magnetic beads are provided are discontinued. Here, slots can be further defined to engage the spherical surface of the magnetic beads. Disconnection can be established by removing the magnetic beads 204, and resumption of connection can be obtained by placing the same thereon.

As illustrated in FIG. 2, the third low pass filter 201 is electrically coupled with the multiplexer port Port1 by means of connection of the wire 272 with the inner conductor 683 of the third capacitor 68. The same principle applies to the second and third low pass filters 202 and 203. By this way, it is realized that both the direct current circuit and RF circuit are coupled with the multiplexer port Port1.

As illustrated again in FIG. 2, corresponding to two band pass filters 610 and 620 of the base body 6, twenty-nine tuning screws 69 are located at two lateral sides of the circuit board 2. When the circuit board 2 and the base body 6 are secured together, the screws 69 can pass through the circuit board 2 and then extended into the interior of the two band pass filters 610 and 620. The screws 69 are used to adjust tuning frequency and coupling degree of the harmonic oscillators of the two band pass filters 610 and 620.

To achieve strong coupling among the harmonic posts 611, a ridge 616 is formed between two adjacent harmonic posts 611 of the two band pass filters 610 and 620. The height of various ridges 616 may vary and be regulated according to certain situation. A gap with a width preferably not less than 1.5 mm is defined between the harmonic posts and the circuit board 2 so as to meet power capacity requirement.

With reference to FIG. 2 again, which shows the cover body 4 used to cover the base body 6, thereby protecting components inside the base body 6. A rubber ring may be provided at the perimeter of the cover body 4 so as to enhance waterproof performance and protect the inner circuit. A Through hole may be defined in the surface of the circuit board 2. A Gore permeable film 40 may be covered on the through hole to keep pressure balance between inside and outside of the base body 6. In addition, a waterproof plate 41 is placed on the through hole to protect the Gore permeable film 40.

In addition, the inner surfaces of the two band pass filters 610 and 620 are coated with silver, thereby greatly reducing attenuation of RF signal transmission and keeping differential loss of the signal within the pass band less than 0.2 dB.

The design of the invention is never limited to DCS/WCDMA antenna feeder sharing system. In addition, the invention can also be applied to systems such as 2G/3G antenna sharing system. In such systems, distributed parameter-type capacitors described above may be employed. Specific shape and layout of the cover body can be varied within the spirit of the invention. As such, the invention can also be adapted to dual frequency multiplexers of general purpose, as well as kinds of antenna feeder sharing systems.

In summary, the invention has overcome drawbacks of prior art. The following advantages can be resulted after making suitable adjustment to electrical structure and physical structure of the multiplexer.

The size of the dual frequency multiplexer of the invention can be reduced even to 218 mm*145.5 mm*51 mm. The sleeve typed coupling construction sufficiently utilizes a room through which the inner conductor of the multiplexer port Port1 passes. Therefore, coupling of RF signal is obtained, and no additional space is necessary. Addition of the lump parameter low pass filters between the direct current circuit and RF circuit ensures isolation between the direct current circuit and RF signal circuit, and reduces largely the size of the printed circuit board on the circuit board.

High isolation is realized. Because each RF circuit is of completely sealed waveguide chamber construction, isolation between the circuits is improved largely. The isolation provided by the first port Port1 to RF signal at frequency of 1710-1880 MHz is larger than 50 dB, and the isolation provided by the second port Port3 to RF signal at frequency of 1920-2170 MHz is also larger than 50 dB.

Higher power capacity is realized. As a gap with sufficient width is defined between each harmonic post within the coaxial chamber and walls of the coaxial chamber, RF signal power support ability of the components is enhanced. Mean power supported by each port is up to 250 watts.

The invention claimed is:

1. A DCS (Digital Cellular System)/WCDMA (Wideband Code Division Multiple Access) dual frequency multiplexer used to multiplex two signals with different frequencies, comprising:
    a multiplexer port configured to convey two signals with different frequencies,
    a first port configured to convey a signal at a first frequency, and
    a second port configured to convey a signal at a second frequency,
    wherein the first port is connected with the multiplexer port through a first RF (radio frequency) circuit and a first direct current circuit;
    wherein the second port is connected with the multiplexer port through a second RF circuit and a second direct current circuit;
    each RF circuit comprises a band pass filter and the band pass filter in series with capacitors connected to each of two sides of the band pass filter and configured to filter a direct circuit signal from a RF circuit signal;
    the two band pass filters are coupled with the multiplexer port via a common capacitor to convey the signal to/from the multiplexer port;
    each direct current circuit comprises a low pass filter and a discharging tube connected to the low pass filter electrically; and
    the two direct current circuits are electrically connected to the multiplexer port through the low pass filters wherein the filtered signals are combined at, and outputted from, the multiplexer port;
    wherein the multiplexer also comprises a box including a base body, a circuit board and a cover body;
    the two band pass filters are disposed in the base body and separated from each other by a metal plate;
    the multiplexer port, first and second ports are positioned on a lateral side of the base body;
    the capacitors are contained in corresponding band pass filters;
    a plurality of support members are disposed on top portion of the base body;
    the low pass filters are supported on the support members;
    the discharging tube and switch are secured on the circuit board;
    the cover body is clamped together with the base body.

2. The DCS/WCDMA dual frequency multiplexer according to claim 1, wherein the capacitors each are of distributed parameter capacitor.

3. The DCS/WCDMA dual frequency multiplexer according to claim 2, wherein each capacitor includes an inner conductor, an insulator and a sleeve;
    the insulator surrounds the inner conductor at an outer perimeter of the inner conductor, while the sleeve surrounds the outer perimeter of the insulator;
    the sleeve serves to electrically connect to adjacent band pass filters;
    the inner conductor is used to connect electrically with adjacent direct current circuit so as to be connected with an adjacent port.

4. The DCS/WCDMA dual frequency multiplexer according to claim 3, wherein the insulator is Polytetrafluoroethene film.

5. The DCS/WCDMA dual frequency multiplexer according to claim 1, wherein each band pass filter comprises a plurality of harmonic posts;
    and a ridge is formed between two adjacent harmonic posts for enhancement of coupling effect.

6. The DCS/WCDMA dual frequency multiplexer according to claim 5, wherein the circuit board has a plurality of tuning screws corresponding to the two band pass filters, the tuning screws passing through the circuit board and extending into inside of the band pass filters for adjusting harmonic frequency and coupling degree.

7. The DCS/WCDMA dual frequency multiplexer according to claim 6, wherein inductive coupling is generated in the first band pass filter by creating openings in the filter, while capacitive coupling is generated in the second band pass filter by flying bars.

8. The DCS/WCDMA dual frequency multiplexer according to claim 7, wherein the first and second band pass filters share a common harmonic post at a location adjacent the multiplexer port.

9. The DCS/WCDMA dual frequency multiplexer according to claim 8, wherein the number of the harmonic posts of the band pass filter located between the first port and multiplexer port is seven, whereas the number of the harmonic posts of the band pass filter located between the second port and multiplexer port is eight.

10. The DCS/WCDMA dual frequency multiplexer according to claim 9, wherein the direct circuit also comprises a switch;
    the printed circuit of the direct circuit has several discontinuous locations where slots are defined, and metal magnetic beads are situated in the slots in order to open or close the direct circuit.

11. The DCS/WCDMA dual frequency multiplexer according to claim 10, wherein a gap with a width not less than 0.2 mm is defined between the top surface of the support member and a bottom surface of the circuit board.

12. The DCS/WCDMA dual frequency multiplexer according to claim 11, wherein the cover plate has a through hole defined therein on which a Gore permeable film is covered.

13. The DCS/WCDMA dual frequency multiplexer according to claim 12, wherein a water proof plate is placed on the through hole.

14. A general dual frequency multiplexer used to multiplex two signals with different frequencies, comprising:

a multiplexer port configured to convey two signals with different frequencies, a first port configured to convey a signal at a first frequency, and a second port configured to convey a signal at a second frequency, wherein the first port is connected with the multiplexer port through a first RF (radio frequency) circuit and a first direct current circuit;

wherein the second port is connected with the multiplexer port through a second RF circuit and a second direct current circuit;

each RF circuit comprises a band pass filter and the band pass filter in series with capacitors connected to each of two sides of the band pass filter and is configured to filter a direct current signal from a RF circuit signal;

the two band pass filters are coupled with the multiplexer port via a common capacitor to convey the signal to/from the multiplexer port;

each direct current circuit comprises a low pass filter and a discharging tube connected to the low pass filter electrically; and the two direct current circuits are electrically connected to the multiplexer port through the low pass filter wherein the filtered signals are combined at, and outputted from, the multiplexer port;

the capacitors each are of distributed parameter capacitor.

15. The general dual frequency multiplexer according to claim 14, wherein each capacitor includes an inner conductor, an insulator and a sleeve;

the insulator surrounds the inner conductor at an outer perimeter thereof, while the sleeve surrounds the outer perimeter of the insulator; the sleeve serves to electrically connect to adjacent band pass filters;

the inner conductor is used to connect electrically with adjacent direct current circuit so as to be connected with an adjacent port.

16. The general dual frequency multiplexer according to claim 15, wherein the insulator is Polytetrafluoroethene film.

17. The general dual frequency multiplexer according to claim 14, wherein each band pass filter comprises a plurality of harmonic posts;

and a ridge is formed between two adjacent harmonic posts for enhancement of coupling effect.

18. The general dual frequency multiplexer according to claim 17, wherein the circuit board has a plurality of tuning screws corresponding to the two band pass filters, the tuning screws passing through the circuit board and extending into inside of the band pass filters for adjusting harmonic frequency and coupling degree.

19. The general dual frequency multiplexer according to claim 18, wherein inductive coupling is generated in the first band pass filter by creating openings in the filter, while capacitive coupling is generated in the second band pass filter by flying bars.

20. The general dual frequency multiplexer according to claim 19, wherein the first and second band pass filters share a common harmonic post at a location adjacent the multiplexer port.

* * * * *